United States Patent [19]

Meisser et al.

[11] Patent Number: 4,480,486
[45] Date of Patent: Nov. 6, 1984

[54] APPARATUS FOR MEASURING LIQUID FLOW

[75] Inventors: Claudio Meisser, Goldau; Hubert Lechner; Benedikt Steinle, both of Zug, all of Switzerland

[73] Assignee: LGZ Landis & Gyr Zug AG, Zug, Switzerland

[21] Appl. No.: 469,043

[22] Filed: Feb. 23, 1983

[30] Foreign Application Priority Data

Mar. 1, 1982 [CH] Switzerland ............... 1227/82

[51] Int. Cl.³ .............................................. G01F 1/66
[52] U.S. Cl. ................................................. 73/861.28
[58] Field of Search .......... 73/861.25, 861.26, 861.27, 73/861.28, 861.29

[56] References Cited

U.S. PATENT DOCUMENTS

| | | | |
|---|---|---|---|
| 3,751,979 | 8/1973 | Ims | 73/861.27 |
| 3,817,098 | 6/1974 | Brown | 73/861.28 |
| 4,104,915 | 8/1978 | Husse | 73/861.28 |
| 4,140,012 | 2/1979 | Hendriks | 73/861.27 |
| 4,325,262 | 4/1982 | Meisser et al. | 73/861.28 |
| 4,365,518 | 12/1982 | Zacharias, Jr. | 73/861.28 X |
| 4,425,804 | 1/1984 | Mount | 73/861.28 |

*Primary Examiner*—Herbert Goldstein
*Attorney, Agent, or Firm*—Ernest F. Marmorek

[57] ABSTRACT

In a housing two ultrasonic measuring transducers are arranged opposite of the two end faces of a test tube. The test tube providing a measuring section penetrates a separating wall and interconnects two distribution chambers of the housing. The fluid to be measured flows through the test tube and influences the transit time of the ultrasonic impulses released and received by the measuring transducers. The test tube provides a constant cross-section of metallic material along the length of the measuring section. The connection between the test tube and the separating wall consists of a nonmetallic material, thus preventing echoes which may penalize the measuring accuracy.

7 Claims, 3 Drawing Figures

APPARATUS FOR MEASURING LIQUID FLOW

BACKGROUND OF THE INVENTION

The invention relates to a measurement value generator for determining the through flow rate of a flowing fluid.

Such measurement value generator is known from U.S. Pat. No. 4,325,262 and U.S. Pat. No. 3,871,098 and comprise a tube as a measuring section interconnecting two distribution chambers. Under certain circumstances the tube may produce undesirable echoes at its points of support, thus impairing the accuracy of measurement.

SUMMARY OF THE INVENTION

According to the present invention, there is provided a configuration which reduces the disturbing echoes and thus increases the accuracy of measurement.

One of the principal objects of the present invention is to devise an apparatus for ultrasonically determining fluid flow passing through a measurement section which is capable of reducing undesirable echoes, thus increasing the accuracy of the measurement.

This object is achieved as follows:

In a housing two ultrasonic measuring transducers are arranged opposite of the two end faces of a test tube. The test tube providing a measuring section penetrates a separating wall and interconnects two distribution chambers of the housing. The fluid to be measured flows through the test tube and influences the transit time of the ultrasonic impulses released and received by the measuring transducers. The test tube provides a constant cross-section of metallic material along the length of the measuring section. The connection between the test tube and the separating wall consists of a nonmetallic material, thus preventing echoes which may penalize the measuring accuracy.

Further objects and advantages of the invention will be set forth in part in the following specification and in part will be obvious therefrom without being specifically referred to, the same being realized and attained as pointed out in the claims hereof.

DESCRIPTION OF THE PREFERRED EMBODIMENT

Figure 1:
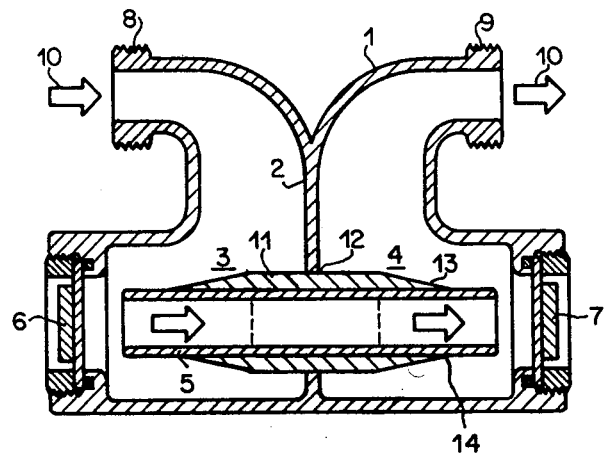
FIG. 1 is a sectional view of a first embodiment of the apparatus, according to the present invention.

In FIG. 1, 1 indicates a housing which houses two distribution chambers 3 and 4 divided by a separating wall. A test tube 5 interconnects the two distribution chambers 3 and 4 hydraulically, penetrating separating wall 2. Two measuring transducers 6 and 7 for ultrasonic pulses are located opposite the two faces of the test tube 5. The axis of the measuring section created by the test tube 5 acts at the same time as a sounding-lead to the center of the active transmission surface of the measuring transducers 6 and 7. The housing 1 is equipped with an inlet pipe 8 and an outlet pipe 9 for the fluid to be measured which flows through the transducer housing 1 according to arrows 10. The transit-time difference of the ultrasonic-pulses transmitted and received by the measuring transducers 6 and 7 serves as the basis for the determination of the amount of fluid passing through the test tube 5.

A portion of the ultrasonic-pulses radiated by the measuring transducers 6 and 7 penetrates the wall of the test tube 5 which consists of red brass, yellow brass or stainless steel. Metallic supporting points of the test tube 5 or a cross-sectional change of the tube material will cause a change in the acoustical impedance of the wall, causing disturbing echoes. To prevent this, the cross-section of the metallic material directly surrounding the measuring section remains the same over the entire length of the measuring section. For this purpose, a nonmetallic connection in the form of a guide bushing 11 has been inserted between the test tube 5 and the separating wall 2 which surrounds at least a part of its length and the external outline of which is supported by the separating wall 2. For this purpose, the separating wall 2 has been provided with a bore-hole 12 into which the guide bushing 11 may, for example, be screwed. There is a firm mechanical connection between the test tube 5 and the guide bushing 11.

The two end faces of the guide bushing 11 may be in the form of plane surfaces. To prevent a possible echo effect also at the edges of these end faces, it may be advantageous to decrease the wall thickness of the guide bushing 11 on both sides of the central portion of constant thickness so as to form cones 13 which are tapered into sharp-edged ends 14, as shown in FIG. 1.

For the guide bushing 11, a material would be most advantageous which has both the required stability for the support of the test tube 5, as well as approximately the same sound impedance when exposed to ultrasonic-pulses as the fluid to be measured. For water, Teflon, hard rubber or hot-water resistant plastics are suitable.

Figure 2:
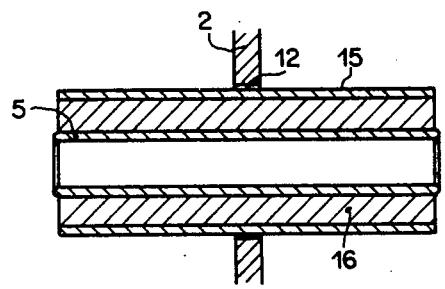
FIG. 2 is a fragmentary sectional view of a second embodiment of the apparatus, according to the present invention.
Figure 3:
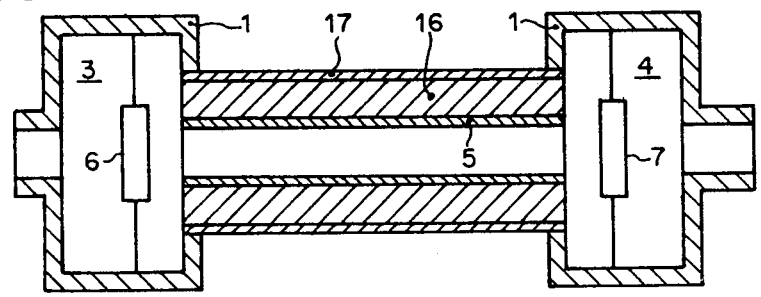
FIG. 3 is a sectional view of a third embodiment of the apparatus, according to the present invention.

As guide bushing of the models shown in FIG. 2 and FIG. 3 serves tube 15 or 17 respectively, with an internal diameter larger than the outer diameter of the test tube 5. The cylinder space 16 between the almost equally long concentric tubes 5 and 15 (or 17, respectively) is filled with a material capable of providing a high degree of acoustic neutralization while, simultaneously, supporting test tube 5. Vulcanized rubber, for example, would be suitable material. In the model shown in FIG. 2, the tube 15 is firmly attached to the bore-hole 12 of the separating wall 2.

In the model shown in FIG. 3, the two distribution chambers 3 and 4 are not formed by a common housing as in the example of FIG. 1, but rather comprise two individual housings. The position of the two distribution chambers 3 and 4 in relation to each other is determined by the connecting tube 17, the ends of which are attached to the housings forming the distribution chambers 3 and 4.

The acoustical neutralization described above does not only result in a higher degree of measuring accuracy but reduces the specimen dispersion in the production of such equipment and thus the expenditures for calibration.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. In a measurement generator for determining the rate of flow of a fluid passing through a pipe system, said pipe system including a housing and a test tube of a predetermined length disposed within said housing, said test tube extending along a longitudinal direction, the fluid flow being determined by measuring the transit time of ultrasound pulses within the fluid flowing through said test tube, a sound pulse emitting transducer being disposed near one end of said test tube in a first distribution chamber, said sound pulse emitting transducer having a first sound-transfer area, a sound-pulse receiving transmitter being disposed near the other end of said test tube in a second distribution chamber, said sound-pulse receiving transducer having a second sound transfer area, at least one distribution chamber forming part of said housing, said test tube including metallic material having a cross-section remaining the same over the entire length of said test tube, a common divider wall having an opening and separating said distribution chambers from one another, said test tube passing through said opening, said transducers being disposed at a certain distance from the respective test tube ends, said test tube guiding the ultrasound pulses from said sound transfer area of said sound-pulse emitting transducer to said sound transfer area of said sound-pulse receiving transducer along an axis coinciding with the flow of said test tube, the improvement comprising non-metallic connecting means extending along and surrounding said test tube so as to connect portions near opposite ends thereof through said opening in said common dividing wall, said common dividing wall extending approximately at right angles to said longitudinal direction, whereby any sound echoes bouncing off said common divided wall are reduced in intensity.

2. A generator according to claim 1, wherein aid nonmetallic connecting means includes a bushing which surrounds at least partially the length of the test tube.

3. A generator according to claim 2, wherein said bushing has a wall thickness which decreases on each side of a central portion of said bushing having a constant thickness.

4. A generator according to claim 2, wherein said bushing includes a tube concentric with said test tube, and having an inner diameter larger than the outer diameter of the test tube, an annular space formed between the two concentrically arranged tubes being filled with a material capable of providing a high degree of acoustical neutralization between the two tubes.

5. A generator according to claim 4, wherein said two distribution chambers are firmly positioned on both ends of said tube respectively.

6. A generator according to claim 4, wherein said material in said annular space includes vulcanized rubber.

7. A generator according to claim 1, further including a second housing, the other distribution chamber forming part of said second housing.

* * * * *